(12) United States Patent
Jiang et al.

(10) Patent No.: US 11,926,794 B2
(45) Date of Patent: Mar. 12, 2024

(54) CONTINUOUS OPERATION METHOD FOR MICROWAVE HIGH-TEMPERATURE PYROLYSIS OF SOLID MATERIAL COMPRISING ORGANIC MATTER

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Haibin Jiang, Beijing (CN); Jinliang Qiao, Beijing (CN); Xiaohong Zhang, Beijing (CN); Wenlu Liu, Beijing (CN); Jianming Gao, Beijing (CN); Guicun Qi, Beijing (CN); Zhihai Song, Beijing (CN); Jinmei Lai, Beijing (CN); Chuanlun Cai, Beijing (CN); Binghai Li, Beijing (CN); Xiang Wang, Beijing (CN); Yue Ru, Beijing (CN); Hongbin Zhang, Beijing (CN); Peng Han, Beijing (CN); Jiangru Zhang, Beijing (CN); Chao Jiang, Beijing (CN); Zhaoyan Guo, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(*) Notice: Subject to any disclaimer, the term of this patent is extended or adjusted under 35 U.S.C. 154(b) by 443 days.

(21) Appl. No.: 17/289,933
(22) PCT Filed: Sep. 27, 2019
(86) PCT No.: PCT/CN2019/108626
  § 371 (c)(1),
  (2) Date: Apr. 29, 2021

(87) PCT Pub. No.: WO2020/088172
  PCT Pub. Date: May 7, 2020

(65) Prior Publication Data
  US 2022/0010216 A1  Jan. 13, 2022

(30) Foreign Application Priority Data
  Oct. 29, 2018  (CN) .......................... 201811264431.3

(51) Int. Cl.
  *C10G 1/10*  (2006.01)
  *B01J 19/00*  (2006.01)
  (Continued)

(52) U.S. Cl.
  CPC ............ *C10G 1/10* (2013.01); *B01J 19/0066* (2013.01); *B01J 19/126* (2013.01); *C10B 19/00* (2013.01);
  (Continued)

(58) Field of Classification Search
  CPC .... C10G 1/10; C10G 1/02; C10G 2300/1003; C10G 2300/1014; C10G 1/00; C10G 3/40;
  (Continued)

(56) References Cited

U.S. PATENT DOCUMENTS 4,118,282 A * 10/1978 Wallace ...................... C10J 3/00
  208/402
5,057,189 A * 10/1991 Apffel ...................... C09C 1/482
  422/150
(Continued)

FOREIGN PATENT DOCUMENTS

CN  1228102 A  9/1999
CN  1898017 A  1/2007
(Continued)

*Primary Examiner* — Ali Z Fadhel
(74) *Attorney, Agent, or Firm* — NKL Law; Allen Xue

(57) ABSTRACT

A continuous operation method is employed for the microwave high-temperature pyrolysis of a solid material containing an organic matter. The method includes the steps of mixing a solid material containing an organic matter with a liquid organic medium; transferring the obtained mixture to a microwave field; and in the microwave field, continuously contacting the mixture with a strong wave absorption material in an inert atmosphere or in vacuum. The strong wave absorption material continuously generates a high temperature under a microwave such that the solid material containing an organic matter and the liquid organic medium are continuously pyrolyzed to implement a continuous operation.

41 Claims, 1 Drawing Sheet

(51) Int. Cl.
 B01J 19/12 (2006.01)
 C10B 19/00 (2006.01)
 C10B 53/02 (2006.01)
 C10B 53/07 (2006.01)
 C10G 1/02 (2006.01)

(52) U.S. Cl.
 CPC .............. C10B 53/02 (2013.01); C10B 53/07 (2013.01); C10G 1/02 (2013.01); C10G 2300/1003 (2013.01); C10G 2300/1014 (2013.01)

(58) Field of Classification Search
 CPC ........ C10G 9/24; C10G 15/08; B01J 19/0066; B01J 19/126; C10B 19/00; C10B 53/02; C10B 53/07; C10B 57/04; C04B 35/053; C04B 35/462; C04B 35/583; C04B 2235/5232; C04B 35/117; C04B 35/488; C04B 35/565; C04B 2235/48; C04B 2235/522; C04B 2235/5224; C04B 2235/80; C04B 35/16; C04B 35/80; C04B 35/83; C04B 2235/425; C04B 2235/5288; C04B 35/524; C04B 2111/00844; C04B 2111/40; C04B 2111/94; C04B 2235/5236; C04B 2235/524; C04B 2235/5244; C04B 2235/667; C04B 38/0032; C04B 38/0022; Y02P 30/20; C01B 32/05; F27D 99/0006; F27D 2099/0028
 See application file for complete search history.

(56) References Cited

U.S. PATENT DOCUMENTS

| | | | |
|---|---|---|---|
| 5,300,202 A * | 4/1994 | Moegel | B01D 53/32 422/186.21 |
| 6,184,427 B1 * | 2/2001 | Klepfer | C10G 1/10 201/2.5 |
| 11,111,439 B1 * | 9/2021 | Adams | C10B 19/00 |
| 2004/0031731 A1 * | 2/2004 | Honeycutt | C10G 1/08 208/402 |
| 2004/0074760 A1 * | 4/2004 | Portnoff | C10L 1/02 204/157.6 |
| 2008/0264934 A1 * | 10/2008 | Moreira | B01J 19/126 219/757 |
| 2011/0219679 A1 * | 9/2011 | Budarin | C10C 5/00 422/186 |
| 2012/0138601 A1 * | 6/2012 | Hemmings | C10G 1/10 219/679 |
| 2012/0192485 A1 * | 8/2012 | Grassi | C10L 5/445 44/605 |
| 2013/0144095 A1 * | 6/2013 | Farneman | C10B 53/07 422/186 |
| 2014/0208638 A1 * | 7/2014 | Van Thorre | B01J 8/10 208/402 |
| 2014/0353207 A1 * | 12/2014 | Strohm | H05H 1/46 208/106 |
| 2015/0068113 A1 * | 3/2015 | Conner | C10L 5/44 204/157.43 |
| 2017/0101584 A1 * | 4/2017 | Skoptsov | B01J 19/126 |
| 2018/0320082 A1 * | 11/2018 | Duncan | C10G 1/10 |
| 2018/0343713 A1 * | 11/2018 | Swiergon | H05B 6/72 |
| 2019/0387587 A1 * | 12/2019 | Hashim | C07C 7/12 |
| 2020/0223692 A1 * | 7/2020 | Hamzehlouia | B01J 35/0033 |
| 2020/0407643 A1 * | 12/2020 | Innocenti | C10B 57/16 |
| 2021/0017353 A1 * | 1/2021 | Sramek | B01J 19/126 |
| 2021/0023526 A1 * | 1/2021 | Watanabe | F27B 9/062 |
| 2021/0106970 A1 * | 4/2021 | Wien | C10B 53/00 |
| 2021/0301208 A1 * | 9/2021 | Wien | B01J 19/126 |

FOREIGN PATENT DOCUMENTS

| | | |
|---|---|---|
| CN | 100999676 A | 7/2007 |
| CN | 101215387 A | 7/2008 |
| CN | 101235312 A | 8/2008 |
| CN | 102585860 A | 7/2012 |
| CN | 102676242 A | 9/2012 |
| CN | 103100365 A | 5/2013 |
| CN | 103252226 A | 8/2013 |
| CN | 104357090 A | 2/2015 |
| CN | 104560091 A | 4/2015 |
| CN | 104785183 A | 7/2015 |
| CN | 105038834 A | 11/2015 |
| CN | 106520176 A | 3/2017 |
| EP | 2692425 A1 | 2/2014 |
| IN | 108913185 A | 11/2018 |
| JP | H09104873 A | 4/1997 |
| JP | 2007516075 A | 6/2007 |
| JP | 2013249427 A | 12/2013 |
| WO | 2012162302 A1 | 11/2012 |
| WO | 2013096309 A1 | 6/2013 |

* cited by examiner

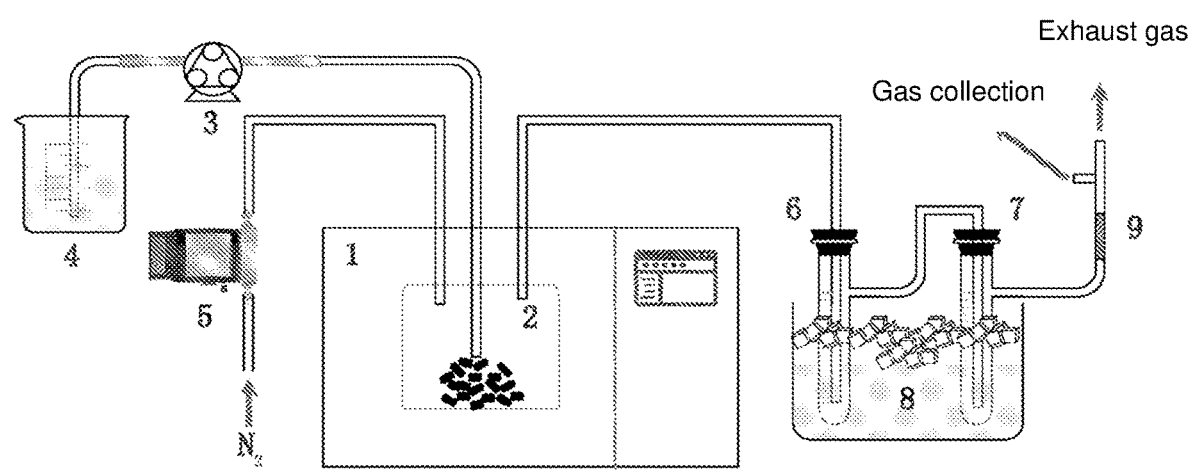

CONTINUOUS OPERATION METHOD FOR MICROWAVE HIGH-TEMPERATURE PYROLYSIS OF SOLID MATERIAL COMPRISING ORGANIC MATTER

TECHNICAL FIELD

The present invention relates to the technical field of resource utilization of a solid material comprising an organic matter, and in particular to a continuous operation method for the microwave high-temperature pyrolysis of a solid material comprising an organic matter.

BACKGROUND ART

More than 90% of chemical raw materials come from fossil energy such as petroleum, shale gas and coal. However, fossil energy is non-renewable and will produce $CO_2$ during its use. Therefore, currently, the development of an environmentally friendly renewable energy has become one of the focuses in the energy field. For more sustainable economic and social development, there is an urgent need to replace the fossil energy with renewable biomass energies. Among them, vegetable oil has become a research focus due to its characteristics such as low price and large-scale cultivation. From 2012 to 2013, a total of 462 million tons of major vegetable oils such as palm oil, rapeseed oil, sunflower oil and soybean oil were produced in the world. Straw is a common agricultural solid waste in rural areas in China, which is characterized by wide distribution and large resource amount. According to a report of the United Nations Environment Programme (UNEP), various grains grown in the world can provide 1.7 billion tons of straw every year, and the straw of various crops in China comes to a total output of more than 700 million tons, which is a huge renewable energy resource. In recent years, the rapid development of pyrolysis technology has made it one of the relatively efficient and mature biomass utilization technologies.

Ever since the 1950s, humans have produced 8.3 billion tons of plastics, of which 6.3 billion tons have become waste. Of the 6.3 billion tons of waste plastics, 9% is recycled, 12% is incinerated, and the remaining 79% (nearly 5.5 billion tons) is buried in landfills or accumulated in the natural environment. Humans are still accelerating the production rate of plastics. At present, the annual output of plastics has reached 400 million tons. It is estimated that by the year 2050, there will be 12 billion tons of waste plastics in the world. Every year, more than 8 million tons of plastics end up in the ocean. If no restrictions are imposed, there will be more plastic garbage in the ocean than fish by the year 2050. In recent years, top international publications have successively published the pollution of plastic particles to the organisms in the ocean and rivers and to drinking water, which has aroused the concern of the whole society on plastic pollution. In 2018, the United Nations Environment Programme focused for the first time on the issue of pollution caused by disposable plastics, and announced "Beat Plastic Pollution" as the theme of the World Environment Day, calling on the whole world to "declare war" on plastic pollution.

To solve the problem of plastic pollution, scientific researchers have made unremitting efforts. Ever since 1970, there has been a lot of research devoted to the preparation of plastics that are degradable in the natural environment. However, degradable plastics have important applications only in biomedicine, agricultural mulch film and garbage bags, etc., and in occasions in need of recycle, the presence of degradable plastics will seriously affect the performance of recycled plastic articles. Moreover, degradable plastics still take a relatively long time to degrade in non-ideal natural environments, thus the problem of white pollution cannot be effectively solved.

At present, mechanical recycling is the only widely-used technical solution for treating waste plastics. The main steps are successively removal of organic residues, washing, crushing, and melting and reprocessing, and in the process of melting and reprocessing, it is generally necessary to blend new materials to maintain the performance. Different plastics respond differently to the processing process, which makes the technical solution of mechanical recycling applicable to only a few types of plastics. At present, actually, only polyethylene terephthalate (PET) and polyethylene (PE) are recycled with said technology, accounting for 9% and 37% of the annual plastic output, respectively. Temperature-sensitive plastics, composite materials, and plastics that do not melt and flow at elevated temperatures (such as thermosetting plastics) cannot be treated by this method.

The chemical recycling method that prepares waste plastics into small molecular hydrocarbons (gas, liquid oil or solid wax) through a chemical conversion or a thermal conversion is considered to be a technical solution that can surpass mechanical recycling, and the resulting products can be used as fuels or chemical raw materials. However, this technical solution has not been widely used at present, mainly due to the high cost. On the one hand, most of the chemical recycling processes require expensive catalysts, and the selectivity of the catalyst requires that the raw material must be pure polymers, which requires time-consuming and labor-intensive sorting of waste plastics. On the other hand, the chemical recycling process consumes a lot of energy.

The microwave pyrolysis technology without catalysts has high energy efficiency and can simultaneously treat different types waste plastics that are polluted to some extent to pyrolyze them into chemical raw materials. It is expected to become the key to solving the problem of plastic pollution.

Microwave refers to an electromagnetic wave having a wavelength between infrared ray and ultrahigh frequency (UHF) radio wave, has a very strong penetrating ability, a wavelength between 1 m and 1 mm, and a corresponding frequency of 300 GHz-300 MHz. The magnetron of the microwave generator receives the power of the power source to generate microwaves, which are transferred to the microwave heater via the waveguide, and the material to be heated is heated under the action of the microwave field. The microwave heating mode is quite different from an ordinary heat transfer. The high-frequency electric field periodically changes the applied electric field and direction at a speed of hundreds of millions per second, so that the polar molecules in the material vibrate at a high frequency with the electric field, and by the friction and squeeze action between molecules, the material heats up rapidly, thereby the internal temperature and surface temperature of the material simultaneously rise rapidly.

Many patents have disclosed the technology of pyrolysis using this characteristic of the microwave, such as the patent application CN102585860A, the patent application CN103252226A, the patent application CN106520176A, etc., which use strongly wave-absorbing materials such as carbon particles and silicon carbide to generate heat in the microwave field and transfer it to the materials to be pyrolyzed, thereby achieving the purpose of pyrolysis. However, waste synthetic polymer materials or waste natural polymer materials are solid at room temperature, thus are quite difficult to be transferred continuously during the pyrolysis. Usually, their microwave pyrolysis can only be done in batch operation, which makes continuous production difficult, and greatly affects the production efficiency.

Therefore, how to develop a highly efficient method for the continuous operation of a process of microwave high-temperature pyrolysis of a solid material comprising an organic matter, especially a waste synthetic polymer material or a waste natural polymer material is still a difficult problem. The development of this method has huge application prospects.

DISCLOSURE OF THE INVENTION

In view of the problems in the prior art, the object of the present invention is to provide a continuous operation method for the microwave high-temperature pyrolysis of a solid material comprising an organic matter. The method according to the present invention can realize continuous, highly efficient, and industrializable operation, and the obtained product can comprise a high proportion of light components (especially gas phase products), and is high value-added.

According to the present invention, by means of such characteristics that a liquid organic medium can be used both as a medium for transferring a solid material comprising an organic matter and jointly as starting materials for pyrolysis, the solid material comprising an organic matter is mixed with the liquid organic medium for transferring, and under an inert atmosphere or vacuum, they are continuously contacted with a strongly wave-absorbing material under a microwave field, said strongly wave-absorbing material generates a high temperature rapidly and continuously under the microwave, so as to continuously pyrolyze the solid material comprising an organic matter and the liquid organic medium together into a fuel (such as hydrogen gas) or a chemical raw material, thereby achieving the continuous operation and further achieving the object. Since the pyrolyzed product comprises hydrogen gas, the method according to the present invention can also be used to prepare hydrogen gas.

Specifically, the present invention provides a continuous operation method for the microwave high-temperature pyrolysis of a solid material comprising an organic matter, characterized in that the method comprises the following continuously performed steps:

mixing the solid material comprising an organic matter with a liquid organic medium;

transferring the resulting mixture to a microwave field; and in the microwave field, under an inert atmosphere or vacuum, continuously contacting the mixture with a strongly wave-absorbing material, wherein the strongly wave-absorbing material continuously generates a high temperature under the microwave, so as to continuously pyrolyze the solid material comprising an organic matter and the liquid organic medium together.

Preferably, the solid material comprising an organic matter is pulverized before being mixed with the liquid organic medium. The particle size after pulverization may be 0.001-10 mm, preferably 0.01-8 mm, more preferably 0.05-5 mm.

The particle size described herein is measured by an optical microscope. The particle size of an individual particle is determined by the largest value of the distance between the two intersection points of a straight line passing through the center of the individual particle and the outline of the particle in the optical microphotograph; and the average particle size is determined by the number-averaged value of the particle size values of all the particles shown in the optical microphotograph.

In one embodiment, the method of the present invention comprises:

pulverizing the solid material comprising an organic matter, followed by mixing it with a liquid organic medium for transferring, continuously contacting the resulting mixture with a strongly wave-absorbing material under a microwave field under an inert atmosphere or vacuum, which strongly wave-absorbing material rapidly and continuously generates a high temperature under the microwave, so as to continuously pyrolyze the solid material comprising an organic matter and the liquid organic medium together into a fuel or chemical raw material.

Herein, the liquid organic medium refers to a medium that is liquid at a temperature of 60° C. and comprises at least one carbon atom, preferably one selected from the group consisting of hydrocarbon oils, vegetable oils, silicone oils, ester oils, phosphate esters and alcohols or a mixture thereof; and more preferably one selected from the group consisting of hydrocarbon oils and vegetable oils or a mixture thereof. Preferably, the liquid organic medium is selected from the group consisting of liquid petroleum hydrocarbons and mixtures thereof and vegetable oils and mixtures thereof; preferably at least one selected from the group consisting of crude oil, naphtha, palm oil, rapeseed oil, sunflower oil, soybean oil, peanut oil, linseed oil and castor oil; and more preferably at least one selected from the group consisting of naphtha, palm oil, rapeseed oil, sunflower oil and soybean oil.

Solid materials comprising an organic matter are difficult to be transferred continuously during the pyrolysis process, thus they can only be operated in batch mode. The main purpose of adding a liquid organic medium is to formulate the liquid organic medium and the powder of the solid material comprising an organic matter into a slurry that can be transferred via a pump, so as to enable the process to be carried out continuously, and at the same time the liquid organic medium can be pyrolyzed together with the solid material comprising an organic matter into a fuel or chemical raw material. The above-mentioned pumping speed only needs to ensure the residence time of the mixture of the solid material comprising an organic matter and the liquid organic medium under the microwave field.

The solid material comprising an organic matter may comprise 10%-90%, preferably 20%-80%, more preferably 30%-75% by mass of the total amount of the solid material comprising an organic matter and the liquid organic medium.

The weight ratio of the feed amount per minute of the solid material comprising an organic matter to the strongly wave-absorbing material may be 1:99-99:1, preferably 1:50-50:1, and more preferably 1:30-30:1.

Herein, the inert atmosphere is an inert gas atmosphere commonly used in the prior art, such as nitrogen, helium, neon, argon, krypton, or xenon, preferably nitrogen.

The microwave power of the microwave field can be 200 W-100 KW; preferably 300 W-80 KW, more preferably 500 W-60 KW.

Herein, the strongly wave-absorbing material refers to a material that can absorb microwaves to a large extent, and the strongly wave-absorbing material can generate a high temperature in a microwave field, for example, rapidly reaching 500-3000° C., preferably 600-3000° C., more preferably 700-3000° C., preferably 800-2500° C., and more preferably 800-2000° C., so that the solid material comprising an organic matter and the liquid organic medium are pyrolyzed together. For example, the strongly wave-absorbing material can be one selected from the group consisting of activated carbon, carbon black, graphite, carbon fiber, silicon carbide, metal oxides and porous composite materials that generate electric arcs in microwaves, or a mixture thereof; preferably one selected from the group consisting of activated carbon, graphite, silicon carbide and porous composite materials capable of generating electric arcs in microwaves, or a mixture thereof; and more preferably a porous composite material capable of generating electric arcs in a microwave field.

The porous composite material capable of generating electric arcs in a microwave field preferably comprises an inorganic porous framework and a carbon material supported on the inorganic porous framework. The term "supported" means that the carbon material is fixed to the surface or in the structure of the inorganic porous framework via specific binding force. The surface refers to all the interfaces of the porous framework that can be in contact with the gas phase. The term "fixed in the structure" refers to being inlaid or anchored inside the porous framework itself, rather than inside the pore channels.

The carbon material may comprise 0.001%-99%, preferably 0.01%-90%, and more preferably 0.1%-80% of the total mass of the porous composite material.

The inorganic porous framework is an inorganic material with a porous structure. The average pore diameter of the inorganic porous framework may be 0.01-1000 μm, preferably 0.05-1000 μm, more preferably 0.05-500 μm, more preferably 0.2-500 μm, more preferably 0.5-500 μm, and more preferably 0.5-250 μm or 0.2-250 μm; and the porosity may be 1%-99.99%; preferably 10%-99.9%, and more preferably 30%-99%.

Herein, the average pore diameter is measured by a scanning electron microscope (SEM). Firstly, the pore diameter of an individual pore is determined by the smallest value of the distance between the two intersection points of the straight line passing through the center of the individual pore and the outline of the pore in the SEM photograph; then, the average pore diameter is determined by the number-averaged value of the pore diameter values of all the pores shown in the SEM photograph.

The porosity is determined with reference to GB/T 23561.4-2009.

The carbon material may be at least one selected from the group consisting of graphene, carbon nanotubes, carbon nanofibers, graphite, carbon black, carbon fibers, carbon dots, carbon nanowires, products obtained by carbonization of a carbonizable organic matter and products after carbonization of a mixture of a carbonizable organic matter, and is preferably at least one selected from the group consisting of graphene, carbon nanotubes, products obtained by carbonization of a carbonizable organic matter and products after carbonization of a mixture of a carbonizable organic matter.

The mixture of a carbonizable organic matter may be a mixture of a carbonizable organic matter with an inorganic substance which is not a metal or a metal compound, and other organic matter which is not a metal compound.

The carbonization means that by treating an organic matter under the conditions of a certain temperature and atmosphere, all or most of the hydrogen, oxygen, nitrogen, sulfur, etc. in the organic matter are volatilized, thereby obtaining a synthetic material with high carbon content.

The carbonizable organic matter is preferably an organic polymer compound, wherein the organic polymer compound includes synthetic polymer compounds and natural organic polymer compounds; the synthetic polymer compound is preferably a rubber or a plastic; and the plastic includes thermosetting plastics and thermoplastics.

The natural organic polymer compound is preferably at least one selected from the group consisting of starch, viscose fiber, lignin and cellulose.

The synthetic polymer compound is preferably at least one selected from the group consisting of epoxy resin, phenolic resin, furan resin, polystyrene, styrene-divinylbenzene copolymer, polyacrylonitrile, polyaniline, polypyrrole, polythiophene, styrene butadiene rubber and polyurethane rubber.

The mixture of a carbonizable organic matter is preferably at least one selected from the group consisting of coal, natural pitch, petroleum pitch and coal tar pitch.

The inorganic material of the inorganic porous framework may be one or a combination of more of carbon, silicate, aluminate, borate, phosphate, germanate, titanate, oxide, nitride, carbide, boride, sulfide, silicide and halide; wherein the oxide is preferably at least one selected from the group consisting of aluminum oxide, silicon oxide, zirconium oxide, magnesium oxide, cerium oxide and titanium oxide; the nitride is preferably at least one selected from the group consisting of silicon nitride, boron nitride, zirconium nitride, hafnium nitride and tantalum nitride; the carbide is preferably at least one selected from the group consisting of silicon carbide, zirconium carbide, hafnium carbide and tantalum carbide; and the boride is preferably at least one selected from the group consisting of zirconium boride, hafnium boride and tantalum boride.

The inorganic material of the inorganic porous framework is more preferably at least one selected from the group consisting of carbon, silicate, aluminum oxide, magnesium oxide, zirconium oxide, silicon carbide, boron nitride, and potassium titanate.

The inorganic porous framework is preferably at least one of the following specific frameworks: a carbon framework obtained after carbonization of a polymer sponge, a porous framework constituted by inorganic fibers, an inorganic sponge framework, a framework constituted by packing of inorganic particles, a ceramic porous framework obtained after baking a ceramic porous framework precursor, a ceramic fiber framework obtained after baking a ceramic fiber framework precursor; preferably a framework after carbonization of melamine sponge, a framework after carbonization of phenolic resin sponge, a porous framework of aluminum silicate fiber (such as aluminum silicate rock wool), a porous framework of mullite fiber, a porous framework of alumina fiber (such as alumina fiber board), a porous framework of zirconia fiber, a porous framework of magnesium oxide fiber, a porous framework of boron nitride fiber, a porous framework of boron carbide fiber, a porous framework of silicon carbide fiber, a porous framework of potassium titanate fiber, and a ceramic fiber framework obtained after baking a ceramic fiber framework precursor.

The porous structure of the inorganic porous framework can be from the pore structure of the framework material itself, such as the sponge-like structural form; or from the pore structure formed by the packing of fiber materials, such as fiber cotton, fiber felt, fiberboard and other structural forms; or from the pore structure formed by the packing of granular materials, such as the sand pile structural form; or from a combination of the above various forms. It is preferably from the pore structure formed by the packing of fiber materials. It should be specially noted that for the porous framework constituted by inorganic fibers as described above, the "porous" therein refers to the pore structure in the framework formed by the packing of fiber materials, but does not mean that the fibers per se are porous.

The porous composite material can generate high-temperature electric arcs in microwaves, for example, in a 900 w microwave field, the porous composite material can generate electric arcs that can raise the temperature thereof to above 1000° C., and the material per se can withstand high temperatures, which are up to 3000° C. This porous composite material that can generate electric arcs in a microwave field is a novel and efficient microwave heating material.

The continuous operation method for the microwave high-temperature pyrolysis of a solid material comprising an organic matter of the present invention can be integrated into the preparation process of the porous composite material.

Specifically, the porous composite material can be prepared by a method comprising the following steps:

(1) immersing the inorganic porous framework or inorganic porous framework precursor into the solution or dispersion of the carbon material and/or carbon material precursor, so that the pores of the inorganic porous framework or inorganic porous framework precursor are filled with the solution or dispersion;

(2) heating and drying the porous material obtained in step (1), so that the carbon material or the carbon material precursor is precipitated or solidified and supported on the inorganic porous framework or the inorganic porous framework precursor;

(3) further performing the following step if at least one of the carbon material precursor or the inorganic porous framework precursor is used as a raw material: heating the porous material obtained in step (2) under an inert gas atmosphere to convert the inorganic porous framework precursor into an inorganic porous framework, and/or reduce or carbonize the carbon material precursor.

The solution or dispersion of the carbon material or its precursor in step (1) may comprise a solvent selected from the group consisting of benzene, toluene, xylene, trichlorobenzene, chloroform, cyclohexane, ethyl caproate, butyl acetate, carbon disulfide, ketone, acetone, cyclohexanone, tetrahydrofuran, dimethylformamide, water and alcohol, and combinations thereof, wherein the alcohol is preferably selected from the group consisting of propanol, n-butanol, isobutanol, ethylene glycol, propylene glycol, 1,4-butanediol, isopropanol, ethanol, and combinations thereof; a solvent comprising water and/or ethanol is more preferred; water and/or ethanol are further preferred; and/or the concentration of the solution or dispersion in step (1) may be 0.001-1 g/mL, preferably 0.002-0.8 g/mL, and more preferably 0.003 g-0.5 g/mL.

The heating and drying in step (2) can be carried out at a temperature of 50-250° C., preferably 60-200° C., and more preferably 80-180° C.; microwave heating is preferred, wherein the power of the microwave is preferably 1 W-100 KW, and more preferably 500 W-10 KW, and the microwave heating time is preferably 2-200 min, and more preferably 20-200 min.

The inorganic porous framework precursor can be selected from the group consisting of ceramic precursors, porous materials of a carbonizable organic matter or porous materials of a mixture comprising a carbonizable organic matter, and combinations thereof.

The carbon material precursor can be graphene oxide, modified carbon nanotubes, modified carbon nanofibers, modified graphite, modified carbon black, modified carbon fibers, carbonizable organic matters or mixtures comprising a carbonizable organic matter and combinations thereof.

The heating of step (3) can be carried out at a temperature of 400-1800° C., preferably 600-1500° C., and more preferably 800-1200° C.; microwave heating is preferred, wherein the microwave power is preferably 100 W-100 KW, and more preferably 700 W-20 KW; and the microwave heating time is preferably 0.5-200 min, and more preferably 1-100 min.

In one embodiment, the method for preparing the porous composite material comprises the following steps:

a. preparing a solution or dispersion of carbon material or carbon material precursor for supporting;

b. immersing an inorganic porous framework or an inorganic porous framework precursor in the solution or dispersion of step a, so that the pores of the inorganic porous framework or the inorganic porous framework precursor are filled with the solution or dispersion; the carbon material and/or carbon material precursor comprising 0.001%-99.999%, preferably 0.01%-99.99%, and more preferably 0.1%-99.9% of the total mass of the inorganic porous framework material or the inorganic porous framework material precursor and the carbon material and/or the carbon material precursor;

c. withdrawing the porous material obtained in step b, followed by heating and drying, so that the carbon material or carbon material precursor is precipitated or solidified, and supported on the inorganic porous framework or the inorganic porous framework precursor; the heating and drying temperature being 50-250° C., preferably 60-200° C., and more preferably 80-180° C.;

obtaining the porous composite material that generates electric arcs in the microwaves after step c if the above starting materials are carbon material and inorganic porous framework;

and further performing the following step d if the starting materials used comprise at least one of the carbon material precursor or the inorganic porous framework precursor;

d. heating the porous material obtained in step c under an inert gas atmosphere, to convert the inorganic porous framework precursor into an inorganic porous framework, and/or reduce or carbonize the carbon material precursor, to thereby obtain the porous composite material that generates electric arcs in the microwaves; the heating temperature being 400-1800° C., preferably 600-1500° C., and more preferably 800-1200° C.

The carbon material precursor is at least one of graphene oxide, modified carbon nanotubes, modified carbon nanofibers, modified graphite, modified carbon black, modified carbon fibers and carbonizable organic matters or mixtures of a carbonizable organic matter. Modified carbon nanotubes, modified carbon nanofibers, modified graphite, modified carbon black, and modified carbon fibers refer to the carbon materials that are pretreated in order to improve the dispersibility of these carbon materials in water or organic solvents and obtain stable dispersions. For example, pretreatment is performed with dispersing agents and surfactants, or pretreatment is performed by grafting hydrophilic groups, etc. These pretreatment means all adopt the pretreatment means for improving dispersibility in the prior art. All the carbon materials subjected to the above pretreatments such as aqueous dispersion of graphene, ethanol dispersion of graphene, aqueous slurry of graphene, oily slurry of graphene, aqueous dispersion of graphene oxide, ethanol dispersion of graphene oxide, N-methylpyrrolidone dispersion of graphene oxide, aqueous dispersion of carbon nanotubes, aqueous dispersion of carboxylated carbon nanotubes, ethanol dispersion of carbon nanotubes, dimethylformamide dispersion of carbon nanotubes, N-methylpyrrolidone slurry of carbon nanotubes, etc., can also be obtained commercially.

The solvent of the solution or dispersion of the carbon material or its precursor in step a can be one selected from the group consisting of benzene, toluene, xylene, trichlorobenzene, trichloromethane, cyclohexane, ethyl caproate, butyl acetate, carbon disulfide, ketone, acetone, cyclohexanone, tetrahydrofuran, dimethylformamide, water and alcohols or a combination thereof.

The alcohols are preferably at least one selected from the group consisting of propanol, n-butanol, isobutanol, ethylene glycol, propylene glycol, 1,4-butanediol, isopropanol and ethanol.

In the preparation method, the carbon material precursor for supporting is preferably a precursor that can be dissolved or dispersed in a solvent, which is friendly to the human body and the environment, prior to supporting, so that the preparation process is "green". The solvent which is friendly to the human body and the environment is at least one selected from the group consisting of ethanol, water and a mixture of the two. That is, the solvent in step a is more preferably a solvent comprising water and/or ethanol; and further preferably, water and/or ethanol.

The solution or dispersion of step a only needs to achieve the sufficient dissolution or sufficient dispersion of the carbon material and/or the carbon material precursor in the solvent. Usually, its concentration can be 0.001-1 g/mL, preferably 0.002-0.8 g/mL, and further preferably 0.003 g-0.5 g/mL.

More specifically, in the preparation method, when the carbon material supported on the inorganic porous framework is graphene, an aqueous solution of graphene oxide is preferably used in step a.

In the preparation method, when the carbon material supported on the inorganic porous framework is carbon nanotubes, a dispersion of carbon nanotubes is preferably used in step a.

In the preparation method, when a thermosetting plastic is selected as the carbon material precursor for supporting, in step a, a suitable curing system needs to be formulated according to the conventional curing formulation of the selected thermosetting plastic in the prior art. In the curing system, optional one or more additives selected from the following group may be added: curing accelerators, dyes, pigments, colorants, antioxidants, stabilizers, plasticizers, lubricants, flow modifiers or aids, flame retardants, anti-dripping agents, anti-caking agents, adhesion promoters, conductive agents, polyvalent metal ions, impact modifiers, release aids, nucleating agents, etc. The amounts of the additives used are all conventional amounts, or can be adjusted according to actual conditions. When a thermosetting plastic is selected as the carbon material precursor for supporting, after heating in the subsequent step c, the thermosetting resin used as the carbon material precursor is cured and supported on the inorganic porous framework.

In the preparation method, when a thermosetting plastic is selected as the carbon material precursor for supporting, in step a, a corresponding good solvent in the prior art is selected to dissolve the above thermosetting plastic and its curing system to obtain a carbon material precursor solution for supporting.

In the preparation method, when a thermoplastic is selected as the carbon material precursor for supporting, the solution of the carbon material precursor for supporting can be added with antioxidants, co-antioxidants, heat stabilizers, light stabilizers, ozone stabilizers, processing aids, plasticizers, softeners, anti-blocking agents, foaming agents, dyes, pigments, waxes, extenders, organic acids, flame retardants, coupling agents and other additives commonly used in the prior art during plastic processing. The amounts of additives used are all conventional amounts or can be adjusted according to actual conditions.

In step b of the preparation method, the pores of the inorganic porous framework can be filled with the solution or dispersion of the carbon material or carbon material precursor for supporting by squeezing several times or not squeezing at all.

After the porous material obtained in step b is withdrawn in step c of the preparation method, measures can be taken or not to remove the excess solution or dispersion of the carbon material or carbon material precursor for supporting in the porous material obtained in step b. The above measures include, but are not limited to, one or two of the squeezing and centrifugal operations.

The heating in steps c and d of the preparation method may preferably be microwave heating, which not only is efficient but also can achieve uniform heating.

Specifically, in step c, the power of the microwave is 1 W-100 KW, preferably 500 W-10 KW, and the microwave time is 2-200 min, preferably 20-200 min.

In step d, the power of the microwave is changed to 100 W-100 KW, preferably 700 W-20 KW; and the microwave time is 0.5-200 min, preferably 1-100 min.

The heating in step d of the preparation method needs to be performed under an inert gas atmosphere, which is selected from the inert gas atmospheres commonly used in the prior art, preferably nitrogen.

The devices used in the preparation method are all common ones.

As described above, the above method for the preparation of a porous composite material combines an inorganic porous framework and a carbon material to prepare a porous composite material which has excellent mechanical properties and can generate electric arcs in a microwave field to thereby rapidly generate a high temperature, for example, in a 900 w microwave field, the porous composite material can generate electric arcs that raise the temperature thereof to above 1000° C. The material per se is resistant to high temperature, the process flow is simple and easy to implement, and it is easy to realize large-scale preparation.

The solid material comprising an organic matter in the present invention can be one of waste plastics, waste rubbers, waste fibers and waste biomasses or a mixture thereof.

The waste plastic in the present invention refers to the plastic and its mixture for civilian, industrial and other purposes that have been used while eventually disused or replaced. The plastic includes, but is not limited to, at least one of polyolefins, polyesters, polyamides, acrylonitrile-butadiene-styrene terpolymer, polycarbonate, polylactic acid, polyurethane, polymethyl methacrylate, polyoxymethylene, polyphenylene ether and polyphenylene sulfide, preferably at least one of polyethylene, polypropylene, polyvinyl chloride, polyethylene terephthalate, polystyrene, polyamide, acrylonitrile-butadiene-styrene terpolymer, polycarbonate, polylactic acid, polymethyl methacrylate and polyoxymethylene, and further preferably at least one of polyethylene, polypropylene, polyvinyl chloride, polyethylene terephthalate, polystyrene, polycarbonate and polyamide.

The waste rubber in the present invention refers to the rubber and its mixture for civil, industrial and other purposes that have been used while eventually disused or replaced. The rubber is preferably at least one of natural rubber, butadiene rubber, styrene butadiene rubber, nitrile rubber, isoprene rubber, ethylene propylene rubber, butyl rubber, chloroprene rubber, styrenic block copolymer and silicone rubber; more preferably at least one of natural rubber, butadiene rubber, styrene butadiene rubber, isoprene rubber and ethylene propylene rubber.

The waste fiber in the present invention refers to the fiber article and its mixture for civil, industrial and other purposes that have been used while eventually disused or replaced. The fiber is preferably at least one of polypropylene fiber, acrylic fiber, vinylon, nylon, polyester fiber, polyvinyl chloride fiber and spandex, more preferably at least one of polypropylene fiber, polyester fiber and spandex.

The waste biomass of the present invention is a variety of animals, plants and algae produced through photosynthesis, and is composed of cellulose, hemicellulose and lignin. It is preferably one of straw, bagasse, tree branches, leaves, wood chips, rice husk, rice straw, peanut shells, coconut shells, palm seed shells and corn cobs or a mixture thereof.

The liquid organic medium of the present invention is preferably a liquid petroleum hydrocarbon and its mixture and/or a vegetable oil and its mixture; more preferably one of crude oil, naphtha, palm oil, rapeseed oil, sunflower oil, soybean oil, peanut oil, linseed oil and castor oil, or a mixture thereof; further preferably one of naphtha, palm oil, rapeseed oil, sunflower oil and soybean oil, or a mixture thereof.

The microwave field in the method of the present invention can be generated by various microwave devices in the prior art, such as household microwave oven, industrialized microwave device (such as microwave pyrolysis reactor) and the like.

In the method of the present invention, the device for placing or loading the solid material comprising an organic matter, the liquid organic medium and the strongly wave-absorbing material can be selected from various containers or pipes in the prior art that can be penetrated by microwaves and can withstand high temperatures of above 1200° C., such as a quartz crucible, a quartz reactor, a quartz tube, an alumina crucible, an alumina reactor, an alumina tube, etc.

In the method of the present invention, the solid material comprising an organic matter and the liquid organic medium are pyrolyzed and then gasified, and the gas obtained after pyrolysis is collected for subsequent treatment, for example, the gas is separated and then used as a fuel or as a raw material for chemical industry for subsequent reaction and production. The residue after pyrolysis is disposed as waste.

The gas collection is a common method in the prior art, and is preferably carried out under an inert atmosphere. For example, an industrial microwave oven with a gas inlet and a gas outlet (such as a microwave pyrolysis reactor, etc.) is used. The gas collection manner is purging with nitrogen during the reaction process, and sampling and collecting with a gas collecting bag at the gas outlet.

In the method of the present invention, by utilizing such characteristics of the liquid organic medium that it can be used both as a medium for transferring the solid material comprising an organic matter and jointly as starting materials for pyrolysis, the solid material comprising an organic matter is pulverized and then mixed with the liquid organic medium for transferring; under an inert atmosphere or under vacuum, the resulting mixture is continuously contacted with the strongly wave-absorbing material under a microwave field, which strongly wave-absorbing material rapidly and continuously generates a high temperature under the microwaves, thereby continuously pyrolyzing the solid material comprising an organic matter and the liquid organic medium together to realize a continuous operation. The method of the invention is continuous in process, highly-efficient and industrializable, and the product composition has high added value. In particular, it is unexpectedly discovered that in the method of the present invention, the combined use of a liquid organic medium and a solid material comprising an organic matter achieves a synergistic effect. The liquid organic medium not only acts as a transferring medium for the solid material, but also promotes the high temperature pyrolysis reaction of them together, so that the continuous operation method has higher pyrolysis efficiency and lighter products.

According to another aspect, the present invention further provides a system for implementing the continuous operation method for the microwave high-temperature pyrolysis of a solid material comprising an organic matter according to the present invention, comprising
  a) a mixing device, which is used to mix the solid material comprising an organic matter with a liquid organic medium;
  b) a transferring device, which is used to continuously transfer the resulting mixture obtained from the mixing device a) to a microwave field; and
  c) a device for generating a microwave field, which is used to continuously contact the mixture from the transferring device b) with a strongly wave-absorbing material under an inert atmosphere or under vacuum, where the strongly wave-absorbing material continuously generates a high temperature in the microwave field, thereby continuously pyrolyzing the solid material comprising an organic matter and the liquid organic medium together.

The mixing device a) can be any type of mixing equipment that can mix a solid material comprising an organic matter with a liquid organic medium, preferably a mixer with a stirring mechanism. Correspondingly, such a process section can also be referred to as a material mixing section or a material stirring section, and said process section refers to an operation section where a solid material comprising an organic matter is mixed with a liquid organic medium.

The device c) for generating a microwave field, as described above, may be a microwave device, such as a household microwave oven and an industrial microwave pyrolysis reactor. The process section herein can also be referred to as a microwave treatment section. The microwave treatment section refers to an operation section where the strongly wave-absorbing material continuously generates a high temperature in the microwave field, so that the solid material comprising an organic matter and the liquid organic medium are pyrolyzed together.

The transferring device b) can be any type of transferring device that can transfer a mixture of a solid (such as a powder) and a liquid, such as pumps, including but not limited to peristaltic pumps, diaphragm pumps, plunger pumps and screw pumps, preferably peristaltic pumps and screw pumps. The rated power of the pump may be 10 W-100 kW, preferably 50 W-50 kW, and more preferably 100 W-30 kW.

The pump can be arranged between the material mixing section and the microwave treatment section. Through a pump (such as a peristaltic pump), a mixture of a solid material comprising an organic matter and a liquid organic medium can be continuously added to the surface of the strongly wave-absorbing material. The pumping speed can ensure the continuous contact of the mixture of the solid/liquid mixed materials and the strongly wave-absorbing material under the microwave field.

For example, the continuous operation method for the microwave high-temperature pyrolysis of a solid material comprising an organic matter according to the present invention can be performed in a system as shown in FIG. 1.

DESCRIPTION OF THE DRAWINGS

FIG. 1 shows a schematic diagram of one embodiment of the system according to the present invention.

EXAMPLES

The present invention is further illustrated with reference to the following examples, but it is not intended to be limited by these examples.

The experimental data in the examples were measured using the following instruments and measurement methods:

1. Determination of the mass percentage of the carbon material supported in the porous composite material obtained in the examples:
   1) In the case that in the starting materials, inorganic porous framework material was used, the weight of inorganic porous framework material as the starting material was first measured, and the weight of the obtained porous composite material was measured after the end of the experiment; the weight difference between the two was the weight of the supported carbon material, thereby the mass percentage of the supported carbon material in the porous composite material was determined.
   2) In the case that in the starting materials, inorganic porous framework precursor was used, two inorganic porous framework precursor samples of the same weight were used. One of them was used in the example according to the present invention; and the other was used in the reference example, wherein only the steps c and d of the preparation method as described above were carried out. After the end of the experiment, the weight of the porous composite material obtained in the example according to the present invention was weighed, and the final weight of the sample obtained in the reference example was weighed; the weight difference between the two was the weight of the supported carbon material, thereby the mass percentage of the supported carbon material in the porous composite material was determined.

2. Unless otherwise specified, the chromatographic analysis of the gas pyrolyzed in the following examples and comparative examples was carried out using the Agilent 6890N gas chromatograph manufactured by the company Agilent, USA as follows.

The Agilent 6890N gas chromatograph used was equipped with an FID detector; involved HP-PLOT $AL_2O_3$ capillary column (50 m×0.53 mm×15 μm) as the chromatograph column; He as the carrier gas, with an average linear velocity of 41 cm/s; the inlet temperature of 200° C.; the detector temperature of 250° C.; the split ratio of 15:1; the injected sample volume of 0.25 ml (gaseous); and the temperature-increasing program, wherein the initial temperature was 55° C. and maintained for 3 min; then increased to 120° C. at 4° C./min and maintained for 4 min; further increased to 170° C. at 20° C./min and maintained for 10 minutes.

3. The average pore diameter of the inorganic porous framework and the porous composite material was determined in the following manner: the pore diameter of a individual pore was determined by the smallest value among the distances between the two intersection points of the straight line passing through the center of the individual pore and the outline of the pore in the scanning electron microscope (SEM) photograph, then the average pore diameter was determined by the number-averaged value of the pore diameter values of all the pores shown in the SEM photograph. The SEM used was Hitachi S-4800 (Hitachi, Japan) with a magnification factor of 200.

4. Method for measuring porosity: The porosity was determined with reference to GB/T 23561.4-2009.

5. Method for measuring particle size: The particle size was measured by an optical microscope (model BX53M, Olympus). The particle size of a individual particle was determined by the largest value among the distances between the two intersection points of a straight line passing through the center of the individual particle and the outline of the particle in the optical microphotograph (magnification factor of 200); and the average particle size was determined by the number-averaged value of the particle size values of all the particles shown in the optical microphotograph.

The starting materials used in the examples were all commercially available.

Preparation of the Porous Composite Material

Example 1

(1) 500 ml of an aqueous dispersion of the graphene oxide (JCGO-95-1-2.6-W, 10 mg/ml, Nanjing Ji Cang Nano Tech Co., LTD.) was measured out and placed in a beaker;

(2) 2 g of a porous framework composed of a phenolic resin (a phenolic foam, an average pore diameter of 300 μm, a porosity of 99%, Changshu Smithers-Oasis Floral Foam Co., Ltd) was immersed into the aqueous dispersion of the graphene oxide, so that the dispersion sufficiently entered into the pore channels of the porous framework;

(3) the immersed porous material was withdrawn and placed on a stainless steel tray, which was placed in an oven at 180° C. and heated for 1 hour, thereby the material was dried and pre-reduced; and (4) the dried porous material was placed in a household microwave oven (700 w, model M1-L213B, Midea) for microwave treatment under a high power for 2 minutes to reduce the pre-reduced graphene oxide to graphene and carbonize the phenolic resin framework into carbon framework (an average pore diameter of 200 μm, and a porosity of 99%), thereby a porous composite material with the graphene supported on the carbon porous framework that can generate electric arcs in a microwave field was obtained, wherein the graphene comprised 10% of the total mass of the porous composite material.

Example 2

(1) 500 ml of a dispersion of the carbon nanotubes (XFWDM, 100 mg/ml, Nanjing XFNANO Materials Tech Co., Ltd.) was measured out and placed in a beaker;
(2) 2 g of a porous framework composed of a phenolic resin (a phenolic foam, an average pore diameter of 200 μm, a porosity of 99%, Changshu Smithers-Oasis Floral Foam Co., Ltd) was immersed into the dispersion of the carbon nanotubes, so that the dispersion of the carbon nanotubes sufficiently entered into the pore channels of the porous framework;
(3) the immersed porous material was withdrawn and placed on a stainless steel tray, which was placed in an oven at 80° C. and heated for 5 hours, thereby the material was dried; and
(4) the dried porous material was placed in a tube furnace and carbonized at 800° C. for 1 hour under a nitrogen atmosphere, and a porous composite material with the carbon nanotubes supported on the carbon porous framework that can generate electric arcs in a microwave field (wherein the carbon framework had an average pore diameter of 140 μm and a porosity of 99%) was obtained, wherein the carbon nanotubes comprised 30% of the total mass of the porous composite material.

Example 3

(1) 500 ml of a dispersion of the carbon nanotubes (XFWDM, 100 mg/ml, Nanjing XFNANO Materials Tech Co., Ltd.) was measured out and placed in a beaker;
(2) 5 g of a fibrous cotton-like porous framework composed of a silicate (an average pore diameter of 150 μm, and a porosity of 90%, Shandong Luyang Energy-saving Materials Co., Ltd.) was immersed into the dispersion of the carbon nanotubes and squeezed several times so that the dispersion sufficiently entered into the pore channels of the porous framework; and
(3) the immersed porous material was withdrawn and placed on a stainless steel tray, which was placed in an oven at 150° C. and heated for 2 hours, thereby the material was dried and a porous composite material with the carbon nanotubes supported on the silicate fiber porous framework that can generate electric arcs in a microwave field was obtained, wherein the carbon nanotubes comprised 10% of the total mass of the porous composite material.

Example 4

(1) 30 g of a powdered phenolic resin (2123, Xinxiang Bomafengfan Industry Co., Ltd.) and 3.6 g of hexamethylenetetramine curing agent were weighed and placed in a beaker, to which 500 ml of ethanol was poured, and the mixture was stirred with a magnetic rotor for 1 hour until the components were all dissolved;
(2) 5 g of a fibrous cotton-like porous framework composed of a silicate (an average pore diameter of 150 μm, and a porosity of 90%, Shandong Luyang Energy-saving Materials Co., Ltd.) was immersed into the formulated solution and squeezed several times, so that the solution sufficiently entered into the pore channels of the porous framework;
(3) the immersed porous material was withdrawn and placed on a stainless steel tray, which was placed in an oven at 180° C. and heated for 2 hours, thereby the material was dried to remove the solvent so that the phenolic resin was cured; and
(4) the dried and cured porous material was placed in a tube furnace and carbonized at 1000° C. for 1 hour under a nitrogen atmosphere to carbonize the phenolic resin, thereby a porous composite material with the phenolic resin carbonized product supported on the silicate fiber porous framework that can generate electric arcs in a microwave field was obtained, wherein the carbon material comprised 5% of the total mass of the porous composite material.

Example 5

(1) 50 g of a liquid phenolic resin (2152, Jining Baiyi Chemicals) was weighed and placed in a beaker, to which 500 ml of ethanol was poured, followed by stirring with a magnetic rotor for 1 hour until the component was all dissolved;
(2) 8 g of a fiberboard-like porous framework composed of alumina (an average pore diameter of 100 μm, and a porosity of 85%, Shandong Luyang Energy-saving Materials Co., Ltd.) was immersed into the formulated solution, so that the solution sufficiently entered into the pore channels of the porous framework;
(3) the immersed porous material was withdrawn and placed on a stainless steel tray, which was placed in an oven at 180° C. and heated for 2 hours, thereby the material was dried to remove the solvent so that the phenolic resin was cured; and
(4) the dried and cured porous material was placed in a tube furnace and carbonized at 900° C. for 1 hour under a nitrogen atmosphere to carbonize the phenolic resin, thereby a porous composite material with the phenolic resin carbonized product supported on the alumina fiber porous framework that can generate electric arcs in a microwave field was obtained, wherein the carbon material comprised 6% of the total mass of the porous composite material.

Example 6

(1) 30 g of a water-soluble starch (medicinal grade, item number: S104454, Shanghai Aladdin Bio-Chem Technology Co., LTD) was weighed and placed in a beaker, to which 500 ml of deionized water was poured, followed by stirring for 1 hour with a magnetic rotor until the component was all dissolved;
(2) 8 g of a fiber mat-like porous framework composed of alumina (an average pore diameter of 100 μm, and a porosity of 85%, Shandong Luyang Energy-saving Materials Co., Ltd.) was immersed into the formulated solution, so that the solution sufficiently entered into the pore channels of the porous framework;
(3) the immersed porous material was withdrawn and placed into a microwave pyrolysis reactor (XOLJ-2000N, Nanjing Atpio Instrument Manufacturing Co., Ltd) for microwave treatment at a power of 10 KW for 2 minutes to dry the porous material; and
(4) the dried porous material was placed in a tube furnace and carbonized at 1200° C. for 1 hour under a nitrogen atmosphere to carbonize the water-soluble starch, thereby a porous composite material with the starch carbonized product supported on the alumina fiber porous framework that can generate electric arcs in a microwave field was obtained, wherein the carbon material comprised 0.1% of the total mass of the porous composite material.

Example 7

(1) 50 g of a water-soluble starch (medicinal grade, item number: S104454, Shanghai Aladdin Bio-Chem Technology Co., LTD) was weighed and placed in a beaker, to which 500 ml of deionized water was poured, followed by stirring for 1 hour with a magnetic rotor until the component was all dissolved;
(2) 8 g of a fiber cotton-like porous framework composed of alumina (an average pore diameter of 100 μm, and a porosity of 85%, Shandong Luyang Energy-saving Materials Co., Ltd.) was immersed into the formulated solution and squeezed several times, so that the solution sufficiently entered into the pore channels of the porous framework;
(3) the immersed porous material was withdrawn and placed into a microwave pyrolysis reactor (XOLJ-2000N, Nanjing Atpio Instrument Manufacturing Co., Ltd) for microwave treatment at a power of 500 W for 2 h to dry the porous material; and
(4) the dried porous material was placed in a tube furnace and carbonized at 1000° C. for 1 hour under a nitrogen atmosphere to carbonize the starch, thereby a porous composite material with the starch carbonized product supported on the alumina fiber porous framework that can generate electric arcs in a microwave field was obtained, wherein the carbon material comprised 0.2% of the total mass of the porous composite material.

Example 8

(1) 2 kg of a liquid phenolic resin (2152, Jining Baiyi Chemicals) was weighed and placed in a beaker, to which 4 L of ethanol was poured, followed by stirring with a magnetic rotor for 1 hour until the component was all dissolved;
(2) 2 g of a porous framework composed of a phenolic resin (a phenolic foam, an average pore diameter of 500 μm, a porosity of 99%, Changshu Smithers-Oasis Floral Foam Co., Ltd) was immersed into the formulated solution, so that the solution sufficiently entered into the pore channels of the porous framework;
(3) the immersed porous material was withdrawn and placed on a stainless steel tray, which was placed in an oven at 150° C. and heated for 2 hours, thereby the material was dried; and
(4) the dried porous material was placed in a microwave pyrolysis reactor (XOLJ-2000N, Nanjing Atpio Instrument Manufacturing Co., Ltd.) for microwave treatment at a power of 20 KW for 100 minutes under a nitrogen atmosphere, thereby a porous composite material with the phenolic resin carbonized product supported on the carbon porous framework that can generate electric arcs in a microwave field (wherein the carbon framework had an average pore diameter of 350 μm and a porosity of 99%) was obtained, wherein the carbon material supported on the inorganic carbon framework comprised 80% of the total mass of the porous composite material.

Example 9

(1) 0.3 g of a liquid phenolic resin (2152, Dining Baiyi Chemicals) was weighed and placed in a beaker, to which 100 ml of ethanol was poured, followed by stirring with a magnetic rotor for 1 hour until the component was all dissolved;
(2) 300 g of an active alumina (an average pore diameter of 0.05 μm, and a porosity of 30%, Shandong Kaiou Chemical Technology Co., Ltd.) was immersed into the formulated solution, so that the solution sufficiently entered into the pore channels of the active alumina;
(3) the immersed porous material was withdrawn and placed on a stainless steel tray, which was placed in an oven at 150° C. and heated for 2 hours, thereby the material was dried; and
(4) the dried porous material was placed in a tube furnace and carbonized at 1000° C. for 1 hour under a nitrogen atmosphere to carbonize the phenolic resin, thereby a porous composite material with the phenolic resin carbonized product supported on the active alumina (porous framework) that can generate electric arcs in a microwave field was obtained, wherein the carbon material comprised 0.05% of the total mass of the porous composite material.

Example 10

(1) 30 g of a powdered phenolic resin (2123, Xinxiang Bomafengfan Industry Co., Ltd.) and 3.6 g of hexamethylenetetramine curing agent were weighed and placed in a beaker, to which 500 ml of ethanol was poured, followed by stirring with a magnetic rotor for 1 hour until dissolution;
(2) 8 g of a fiberboard-like porous framework composed of magnesium oxide (an average pore diameter of 100 μm, and a porosity of 80%, Jinan Huolong Thermal Ceramics Co., Ltd.) was immersed into the formulated solution, so that the solution sufficiently entered into the pore channels of the porous framework;
(3) the immersed porous material was withdrawn and placed on a stainless steel tray, which was placed in an oven at 180° C. and heated for 2 hours, thereby the material was dried to remove the solvent so that the phenolic resin was cured; and
(4) the dried and cured porous material was placed in a tube furnace and carbonized at 1000° C. for 1 hour under a nitrogen atmosphere to carbonize the phenolic resin, thereby a porous composite material with the phenolic resin carbonized product supported on the magnesium oxide fiber porous framework that can generate electric arcs in a microwave field was obtained, wherein the carbon material comprised 3% of the total mass of the porous composite material.

Example 11

(1) 100 g of a water-soluble starch (medicinal grade, Shanghai Aladdin Bio-Chem Technology Co., LTD) was weighed and placed in a beaker, to which 500 ml of deionized water was poured, followed by stirring for 1 hour with a magnetic rotor until the component was all dissolved;
(2) 8 g of a fiberboard-like porous framework composed of zirconia (an average pore diameter of 150 μm, and a porosity of 80%, Jinan Huolong Thermal Ceramics Co., Ltd.) was immersed into the formulated solution, so that the solution sufficiently entered into the pore channels of the porous framework;
(3) the immersed porous material was withdrawn and placed into a microwave pyrolysis reactor (XOLJ- 2000N, Nanjing Atpio Instrument Manufacturing Co., Ltd) for microwave treatment at a power of 3 KW for 20 minutes to dry the porous material; and (4) the dried porous material was placed in a tube furnace and carbonized at 900° C. for 2 hours under a nitrogen atmosphere to carbonize the starch, thereby a porous composite material with the starch carbonized product supported on the zirconia fiber porous framework that can generate electric arcs in a microwave field was obtained, wherein the carbon material comprised 0.5% of the total mass of the porous composite material.

Example 12

(1) 50 g of a liquid phenolic resin (2152, Jining Baiyi Chemicals) was weighed and placed in a beaker, to which 500 ml of ethanol was poured, followed by stirring with a magnetic rotor for 1 hour until the component was all dissolved;

(2) 8 g of a fiberboard-like porous framework composed of boron nitride (an average pore diameter of 100 μm, and a porosity of 80%, Jinan Huolong Thermal Ceramics Co., Ltd.) was immersed into the formulated solution, so that the solution sufficiently entered into the pore channels of the porous framework;

(3) the immersed porous material was withdrawn and placed on a stainless steel tray, which was placed in an oven at 180° C. and heated for 2 hours, thereby the material was dried to remove the solvent so that the phenolic resin was cured; and (4) the dried and cured porous material was placed in a tube furnace and carbonized at 900° C. for 1 hour under a nitrogen atmosphere to carbonize the phenolic resin, thereby a porous composite material with the phenolic resin carbonized product supported on the boron nitride fiber porous framework that can generate electric arcs in a microwave field was obtained, wherein the carbon material comprised 5% of the total mass of the porous composite material.

Example 13

(1) 100 g of a liquid phenolic resin (2152, Dining Baiyi Chemicals) was weighed and placed in a beaker, to which 500 ml of ethanol was poured, followed by stirring with a magnetic rotor for 1 hour until the component was all dissolved;

(2) 8 g of a fiberboard-like porous framework composed of silicon carbide (an average pore diameter of 100 μm, and a porosity of 80%, Jinan Huolong Thermal Ceramics Co., Ltd.) was immersed into the formulated solution, so that the solution sufficiently entered into the pore channels of the porous framework;

(3) the immersed porous material was withdrawn and placed on a stainless steel tray, which was placed in an oven at 180° C. and heated for 2 hours, thereby the material was dried to remove the solvent so that the phenolic resin was cured; and (4) the dried and cured porous material was placed in a tube furnace and carbonized at 800° C. for 1 hour under a nitrogen atmosphere to carbonize the phenolic resin, thereby a porous composite material with the phenolic resin carbonized product supported on the silicon carbide fiber porous framework that can generate electric arcs in a microwave field was obtained, wherein the carbon material comprised 10% of the total mass of the porous composite material.

Example 14

(1) 100 g of a liquid phenolic resin (2152, Dining Baiyi Chemicals) was weighed and placed in a beaker, to which 500 ml of ethanol was poured, followed by stirring with a magnetic rotor for 1 hour until the component was all dissolved;

(2) 8 g of a fiberboard-like porous framework composed of potassium titanate (an average pore diameter of 100 μm, and a porosity of 80%, Jinan Huolong Thermal Ceramics Co., Ltd.) was immersed into the formulated solution, so that the solution sufficiently entered into the pore channels of the porous framework;

(3) the immersed porous material was withdrawn and placed on a stainless steel tray, which was placed in an oven at 180° C. and heated for 2 hours, thereby the material was dried to remove the solvent so that the phenolic resin was cured; and (4) the dried and cured porous material was placed in a tube furnace and carbonized at 800° C. for 1 hour under a nitrogen atmosphere to carbonize the phenolic resin, thereby a porous composite material with the phenolic resin carbonized product supported on the potassium titanate fiber porous framework that can generate electric arcs in a microwave field was obtained, wherein the carbon material comprised 10% of the total mass of the porous composite material.

Continuous Operation of Microwave Pyrolysis of a Solid Material Comprising an Organic Matter

Example 15

50 g of a high-density polyethylene (HDPE, 3300F, Maoming Petrochemical) was pulverized at a low temperature (the particle size after pulverization was about 100 microns), and fully stirred with 100 g of a palm oil (commercially available) in a three-necked flask. 30 g of the porous composite material obtained in Example 1 was placed in a quartz reactor, which was purged with 500 ml/min nitrogen for 10 min, followed by adjusting the flow rate to 100 ml/min, the microwave pyrolysis reactor (XOLJ-2000N, Nanjing Atpio Instrument Manufacturing Co., Ltd) was started with a power of 1000 W, the above materials were continuously added through a quartz capillary at a speed of about 2 g/min using a peristaltic pump (LongerPump BT100-2J precision peristaltic pump) to the surface of the porous composite material in the quartz reactor, and were continuously pyrolyzed into gases, which were collected with a gas collecting bag at the gas outlet. The collected gases were chromatographically analyzed, and the analysis results are shown in Table 1.

30 g of a polypropylene (PP, F280, Shanghai Petrochemical) was pulverized at a low temperature (the particle size after pulverization was about 100 microns), and stirred with 30 g of a soybean oil (commercially available) in a three-necked flask. 50 g of the porous composite material obtained in Example 6 was placed in a quartz reactor, which was purged with 500 ml/min nitrogen for 10 min, followed by adjusting the flow rate to 100 ml/min, the microwave pyrolysis reactor (XOLJ-2000N, Nanjing Atpio Instrument Manufacturing Co., Ltd) was started with a power of 1500 W, the above materials were continuously added through a quartz capillary at a speed of about 2 g/min using a peristaltic pump (LongerPump BT100-2J precision peristaltic pump) to the surface of the porous composite material in the quartz reactor, and were continuously pyrolyzed into gases, which were collected with a gas collecting bag at the gas outlet. The collected gases were chromatographically analyzed, and the analysis results are also shown in Table 1.

TABLE 1

| Materials | Methane vol % | Ethane, propane vol % | Ethylene vol % | Propylene vol % | Acetylene, propyne vol % | 1-Butene, isobutene, vol % | 1,3-Butadiene vol % | Others vol % |
|---|---|---|---|---|---|---|---|---|
| HDPE + palm oil | 12 | 4 | 43 | 15 | 4 | 6 | 7 | 9 |
| PP + soybean oil | 14 | 6 | 37 | 20 | 4 | 7 | 5 | 7 |

Example 16

Example 15 was repeated, except that the soybean oil was replaced with a palm oil and the high-density polyethylene was replaced with a low-density polyethylene, and the collected gases were chromatographically analyzed as follows: the gas product collected after pyrolysis was analyzed using a refinery gas analyzer (HP Agilent 7890 A, configured with 3 channels, including 1 FID and 2 TCDs (thermal conductivity detector)) in accordance with the ASTM D1945-14 method. Hydrocarbons were analyzed on the FID channel. One TCD using a nitrogen carrier gas was used to determine the hydrogen content, because there was a small difference between hydrogen and helium carrier gas in conductivity. The other TCD using helium as the carrier gas was used to detect CO, $CO_2$, $N_2$, and $O_2$. For quantitative analysis, the response factor was determined by using RGA (refinery gas analysis) calibration gas standards. The analysis results are shown in Table 2-1.

In addition, for comparison, the following batch experiments were performed.

PE-batch method: 50 g of a low-density polyethylene (LDPE, LD600, Yanshan Petrochemical) was pulverized at a low temperature and placed in a three-necked flask. 30 g of the porous composite material obtained in Example 1 was placed in a quartz reactor, the above material was added to the surface of the porous composite material in the quartz reactor, which was purged with 500 ml/min nitrogen for 10 min, followed by adjusting the flow rate to 100 ml/min, the microwave pyrolysis reactor (XOLJ-2000N, Nanjing Atpio Instrument Manufacturing Co., Ltd) was started with a power of 1000 W, the above material was added to the surface of the porous composite material in the quartz reactor, and was pyrolyzed into gases, which were collected with a gas collecting bag at the gas outlet. As mentioned previously in this example, the collected gases were chromatographically analyzed, and the analysis results are shown in Table 2-1.

PP-batch method: 30 g of a polypropylene (PP, F280, Shanghai Petrochemical) was pulverized at a low temperature and placed in a three-necked flask. 50 g of the porous composite material obtained in Example 6 was placed in a quartz reactor, which was purged with 500 ml/min nitrogen for 10 min, followed by adjusting the flow rate to 100 ml/min, the microwave pyrolysis reactor (XOLJ-2000N, Nanjing Atpio Instrument Manufacturing Co., Ltd) was started with a power of 1500 W, the above material was added to the surface of the porous composite material in the quartz reactor, and was continuously pyrolyzed into gases, which were collected with a gas collecting bag at the gas outlet. As mentioned previously in this example, the collected gases were chromatographically analyzed, and the analysis results are also shown in Table 2-1.

In addition, as a reference, a similar experiment was performed using 100 g of a palm oil instead of the above low-density polyethylene, and the analysis results are shown in Table 2-1.

TABLE 2-1

| Product/wt. % | | Palm oil | PE | PP | Palm oil + PE | Palm oil + PP |
|---|---|---|---|---|---|---|
| Solid phase | | 22.0 | 8.5 | 3.3 | 14.0 | 5.4 |
| Liquid phase | | 6.6 | 41.2 | 32.5 | 8.3 | 1.1 |
| Gas phase | | 71.4 | 50.3 | 64.2 | 77.7 | 93.5 |
| Gas phase composition | Hydrogen | 3.3 | 0.8 | 0.5 | 1.8 | 2.1 |
| | Carbon monoxide | 15.5 | 1.4 | 0.8 | 12.9 | 9.7 |
| | Carbon dioxide | 12.8 | 0 | 0 | 10.1 | 7.9 |
| | Methane | 24.1 | 19.2 | 8.3 | 16.0 | 20.7 |
| | Ethane | 2.7 | 4.6 | 4.8 | 3.3 | 3.2 |
| | Ethylene | 30.3 | 30.3 | 14.0 | 26.6 | 32.0 |
| | Propane | 0.3 | 2.0 | 4.0 | 2.0 | 1.0 |
| | Propylene | 4.5 | 22.6 | 52.5 | 15.1 | 16.1 |
| | Acetylene | 1.8 | 1.6 | 0.2 | 1.2 | 1.0 |
| | 1-Butene | 0.2 | 1.3 | 1.0 | 1.8 | 0.1 |
| | 1,3-Butadiene | 0.6 | 4.2 | 1.7 | 1.4 | 1.1 |
| | Benzene | 1.4 | 0.1 | 0.1 | 0.2 | 0.2 |
| | Others (comprising butane, allene, 2-butene, isobutene, propyne, etc.) | 2.5 | 11.9 | 12.1 | 7.6 | 4.9 |
| | Diene yield | 24.8 | 26.6 | 42.7 | 32.4 | 45.0 |

From the data in Table 2-1, it can be seen that the proportion of the gas phase products obtained by the continuous operation method of both palm oil and polyethylene was significantly higher than those of the gas phase products obtained by the batch operation method of using polyethylene alone and palm oil alone. Clearly, the combined use of palm oil and polyethylene achieved a synergistic effect. Palm oil not only functioned as a transferring medium for polyethylene but also promoted the high-temperature pyrolysis reaction of the two together, making the continuous operation method have a higher pyrolysis efficiency and lighter products.

In addition, activated carbon was used to replace the porous composite material according to Example 1 or 6 to repeat the above experiment. The analysis results are shown in Table 2-2.

TABLE 2-2

| Product/wt. % | | Palm oil | PE | PP | Palm oil + PE | Palm oil + PP |
|---|---|---|---|---|---|---|
| Solid phase | | 15 | 6.3 | 3.1 | 9.8 | 5.2 |
| Liquid phase | | 42.1 | 50.3 | 45.7 | 31.7 | 18.8 |
| Gas phase | | 42.9 | 43.4 | 51.2 | 58.5 | 76 |
| Gas phase composition | Hydrogen | 2.9 | 0.7 | 0.4 | 1.5 | 1.9 |
| | Carbon monoxide | 13.2 | 1.1 | 0.6 | 12.3 | 8.6 |
| | Carbon dioxide | 11.7 | 0 | 0 | 9.8 | 6.3 |
| | Methane | 20.6 | 19.6 | 8.1 | 10.2 | 17.9 |
| | Ethane | 2.9 | 4.4 | 4.5 | 3.5 | 3.5 |
| | Ethylene | 32.3 | 28.4 | 14.5 | 29.8 | 35 |
| | Propane | 0.4 | 2.3 | 4.3 | 2.5 | 1.1 |
| | Propylene | 5.1 | 23.8 | 50.3 | 17.3 | 18.1 |
| | Acetylene | 1.9 | 1.6 | 0.2 | 1.1 | 1.1 |
| | 1-Butene | 0.3 | 1.5 | 1.5 | 1.7 | 0.1 |
| | 1,3-Butadiene | 0.7 | 4.4 | 1.9 | 1.4 | 1.2 |
| | Benzene | 1.6 | 0.1 | 0.1 | 0.2 | 0.2 |
| | Others (comprising butane, allene, 2-butene, isobutene, propyne, etc.) | 6.4 | 12.1 | 13.6 | 8.7 | 5 |

From the data in Table 2-2, it can be seen that when activated carbon was used as the strongly wave-absorbing material, a synergistic effect was also achieved. The proportion of the gas phase products obtained by the continuous operation method of both palm oil and polyethylene was significantly higher than those of the gas phase products obtained by the batch operation method of using polyethylene alone and palm oil alone. Palm oil not only functioned as a transferring medium for polyethylene but also promoted the high-temperature pyrolysis reaction of the two together, making the continuous operation method have a higher pyrolysis efficiency and lighter products as is compared with the batch method.

In addition, from the comparison of Table 2-2 and Table 2-1, it can be seen that the proportion of the gas phase products obtained in the microwave high-temperature pyrolysis performed using a specific porous composite material that can generate electric arcs in a microwave field was significantly higher than that using activated carbon, thus the method using such porous composite material had a higher pyrolysis efficiency, lighter products, and a higher added value of products.

LIST OF REFERENCE SIGNS

1 Microwave oven
2 Quartz reactor
3 Peristaltic pump
4 Starting materials
5 Gas flow meter
6, 7 Cold trap
8 Ice water bath
9 Cotton filter

The invention claimed is:

1. A continuous operation method for microwave high-temperature pyrolysis of a solid material comprising an organic matter, wherein the method comprises the following continuously performed steps:
mixing the solid material comprising an organic matter with a liquid organic medium;
transferring the resulting mixture to a microwave field; and
in the microwave field, under an inert atmosphere or under vacuum, continuously contacting the mixture with a strongly wave-absorbing material, wherein the strongly wave-absorbing material continuously generates a high temperature of 500-3000° C. in the microwave field, so that the solid material comprising an organic matter and the liquid organic medium are continuously pyrolyzed together.

2. The method according to claim 1, wherein the liquid organic medium refers to a medium that is liquid at a temperature of 60° C. and contains at least one carbon atom.

3. The method according to claim 1, wherein the solid material comprising an organic matter comprises 10%-90% by mass of the total amount of the solid material comprising an organic matter and the liquid organic medium.

4. The method according to claim 1, wherein the weight ratio of the feed amount per minute of the solid material comprising an organic matter to the strongly wave-absorbing material is 1:99-99:1.

5. The method according to claim 1, wherein the microwave field is generated by a microwave device, the microwave power of the microwave field is 200W-100 KW.

6. The method according to claim 1, wherein the solid material comprising an organic matter is pulverized before being mixed with the liquid organic medium.

7. The method according to claim 1, wherein the strongly wave-absorbing material is one selected from the group consisting of activated carbon, carbon black, graphite, carbon fiber, silicon carbide, metal oxides, porous composite materials that can generate electric arcs in a microwave field, and a mixture thereof.

8. The method according to claim 7, wherein the porous composite material that can generate electric arcs in a microwave field comprises an inorganic porous framework, and a carbon material supported on the inorganic porous framework.

9. The method according to claim 8, wherein the proportion of the carbon material is 0.001%-99%, based on the total mass of the porous composite material; and/or
the electric arcs generated by the porous composite material in a microwave field make the temperature of the porous composite material reach above 1000° C.; and/or
the carbon material is selected from the group consisting of graphene, carbon nanotubes, carbon nanofibers, graphite, carbon black, carbon fibers, carbon dots, carbon nanowires, products obtained by carbonization of carbonizable organic matter or a mixture comprising a carbonizable organic matter, and combinations thereof; and/or
the inorganic porous framework is an inorganic material having a porous structure, which is selected from the group consisting of carbon, silicate, aluminate, borate, phosphate, germanate, titanate, oxide, nitride, carbide, boride, sulfide, silicide, halide, and combinations thereof;.

10. The method according to claim 8, wherein the method comprises preparation of the porous composite material by a method comprising the following steps:
(1) immersing the inorganic porous framework or inorganic porous framework precursor into a solution or dispersion of the carbon material and/or carbon material precursor, so that pores of the inorganic porous framework or inorganic porous framework precursor are filled with the solution or dispersion;
(2) heating and drying the porous material obtained in step (1), so that the carbon material or the carbon material precursor is precipitated or solidified and supported on the inorganic porous framework or the inorganic porous framework precursor;

(3) further performing the following step when at least one of the carbon material precursor or the inorganic porous framework precursor is used as a starting material: heating the porous material obtained in step (2) under an inert gas atmosphere to convert the inorganic porous framework precursor into an inorganic porous framework, and/or reducing or carbonizing the carbon material precursor.

11. The method according to claim 10, wherein
the solution or dispersion of the carbon material or its precursor in step (1) comprises a solvent selected from the group consisting of benzene, toluene, xylene, trichlorobenzene, chloroform, cyclohexane, ethyl caproate, butyl acetate, carbon disulfide, ketone, acetone, cyclohexanone, tetrahydrofuran, dimethylformamide, water and alcohol, and combinations thereof; and/or
the concentration of the solution or dispersion in step (1) is 0.001-1 g/mL; and/or
in step (1), the carbon material and/or carbon material precursor comprises 0.001%-99.999% of the total mass of the inorganic porous framework material or the inorganic porous framework material precursor and the carbon material and/or the carbon material precursor.

12. The method according to claim 10, wherein the heating and drying in step (2) is carried out at a temperature of 50-250° C.

13. The method according to claim 10, wherein
the inorganic porous framework precursor is selected from the group consisting of ceramic precursors, porous materials composed of a carbonizable organic matter or porous materials composed of a mixture comprising a carbonizable organic matter, and combinations thereof; and/or
the carbon material precursor is graphene oxide, modified carbon nanotubes, modified carbon nanofibers, modified graphite, modified carbon black, modified carbon fibers, carbonizable organic matters or mixtures comprising a carbonizable organic matter and combinations thereof; and/or
the heating of step (3) is carried out at a temperature of 400-1800° C.

14. The method according to claim 1, wherein the solid material comprising an organic matter is a waste synthetic polymer material or a waste natural polymer material.

15. A system for implementing the method according to claim 1, comprising
a) a mixing device configured to mix the solid material comprising an organic matter with a liquid organic medium;
b) a transferring device configured to continuously transfer the resulting mixture from the mixing device a) to a microwave field; and
c) a device for generating a microwave field, configured to continuously contact the mixture from the transferring device b) with a strongly wave-absorbing material under an inert atmosphere or under vacuum, wherein the strongly wave-absorbing material continuously generates a high temperature in the microwave field, so that the solid material comprising an organic matter and the liquid organic medium are continuously pyrolyzed together.

16. The system according to claim 15, wherein
the mixing device a) is a mixer with a stirring mechanism; and/or
the transferring device b) is a pump; and/or
the device for generating a microwave field is a microwave device, for example.

17. The method according to claim 2, wherein the liquid organic medium is one selected from the group consisting of hydrocarbon oils, vegetable oils, silicone oils, ester oils, phosphate esters, alcohols, and a mixture thereof.

18. The method according to claim 2, wherein the liquid organic medium is at least one selected from the group consisting of crude oil, naphtha, palm oil, rapeseed oil, sunflower oil, soybean oil, peanut oil, linseed oil, and castor oil.

19. The method according to claim 3, wherein the solid material comprising an organic matter comprises 30%-75% by mass of the total amount of the solid material comprising an organic matter and the liquid organic medium.

20. The method according to claim 4, wherein the weight ratio of the feed amount per minute of the solid material comprising an organic matter to the strongly wave-absorbing material is 1:30-30:1.

21. The method according to claim 5, wherein the microwave power of the microwave field is 500W-60KW.

22. The method according to claim 6, wherein the particle size after pulverization is 0.001-10 mm.

23. The method according to claim 6, wherein the particle size after pulverization is 0.05-5 mm.

24. The method according to claim 8, wherein the average pore diameter of the inorganic porous framework is 0.01-1000 μm.

25. The method according to claim 24, wherein the average pore diameter of the inorganic porous framework is 0.2-500 μm.

26. The method according to claim 24, wherein the average pore diameter of the inorganic porous framework is 0.5-250 μm.

27. The method according to claim 8, wherein the porosity of the inorganic porous framework is 10%-99.9%.

28. The method according to claim 27, wherein the porosity of the inorganic porous framework is 30%-99%.

29. The method according to claim 9, wherein the proportion of the carbon material is 0.1%-80%, based on the total mass of the porous composite material.

30. The method according to claim 9, wherein the carbonizable organic matter is selected from the group consisting of synthetic organic polymer compounds and natural organic polymer compounds.

31. The method according to claim 30, wherein the synthetic organic polymer compounds are selected from rubbers, plastics, thermosetting plastics, and thermoplastics, and the natural organic polymer compounds are at least one selected from the group consisting of starch, viscose fiber, lignin, and cellulose.

32. The method according to claim 31, wherein the synthetic organic polymer compounds are selected from the group consisting of epoxy resin, phenolic resin, furan resin, polystyrene, styrene-divinylbenzene copolymer, polyacrylonitrile, polyaniline, polypyrrole, polythiophene, styrene butadiene rubber, polyurethane rubber, and combinations thereof.

33. The method according to claim 9, wherein the mixture comprising a carbonizable organic matter is the mixture comprising a carbonizable organic matter and a metal-free organic matter and/or a metal-free inorganic matter.

34. The method according to claim 33, wherein the mixture comprising a carbonizable organic matter is selected from the group consisting of coal, natural pitch, petroleum pitch, coal tar pitch, and combinations thereof.

35. The method according to claim 9, wherein:
the oxide is selected from the group consisting of aluminum oxide, silicon oxide, zirconium oxide, magnesium oxide, cerium oxide, titanium oxide, and combinations thereof;
the nitride is selected from the group consisting of silicon nitride, boron nitride, zirconium nitride, hafnium nitride, tantalum nitride, and combinations thereof;
the carbide is selected from the group consisting of silicon carbide, zirconium carbide, hafnium carbide, tantalum carbide, and combinations thereof; and
the boride is selected from the group consisting of zirconium boride, hafnium boride, tantalum boride, and combinations thereof.

36. The method according to claim 9, wherein the inorganic porous framework is at least one selected from a carbon framework obtained after carbonization of a polymer sponge, a porous framework constituted by inorganic fibers, an inorganic sponge framework, a framework constituted by packing of inorganic particles, a ceramic porous framework obtained after baking a ceramic porous framework precursor, and a ceramic fiber framework obtained after baking a ceramic fiber framework precursor.

37. The method according to claim 9, wherein the inorganic porous framework is at least one selected from a framework after carbonization of melamine sponge, a framework after carbonization of phenolic resin sponge, a porous framework of aluminum silicate fiber, a porous framework of mullite fiber, a porous framework of alumina fiber, a porous framework of zirconia fiber, a porous framework of magnesium oxide fiber, a porous framework of boron nitride fiber, a porous framework of boron carbide fiber, a porous framework of silicon carbide fiber, a porous framework of potassium titanate fiber, and a ceramic fiber framework obtained after baking a ceramic fiber framework precursor.

38. The method according to claim 11, wherein the solvent in the solution or dispersion of the carbon material or its precursor in step (1) is water and/or ethanol.

39. The method according to claim 11, wherein, in step (1), the carbon material and/or carbon material precursor comprises 0.1%-99.9% of the total mass of the inorganic porous framework material or the inorganic porous framework material precursor and the carbon material and/or the carbon material precursor.

40. The method according to claim 14, wherein the solid material comprising an organic matter is selected from the group consisting of waste plastics, waste rubbers, waste fibers, waste biomasses, and a mixture thereof.

41. The method according to claim 40, wherein:
the plastic is at least one selected from the group consisting of polyolefins, polyesters, polyamides, acrylonitrile-butadiene-styrene terpolymer, polycarbonate, polylactic acid, polyurethane, polymethyl methacrylate, polyoxymethylene, polyphenylene ether, and polyphenylene sulfide;
the rubber is at least one selected from the group consisting of natural rubber, butadiene rubber, styrene butadiene rubber, nitrile rubber, isoprene rubber, ethylene propylene rubber, butyl rubber, chloroprene rubber, styrenic block copolymer, and silicone rubber;
the fiber is at least one selected from the group consisting of polypropylene fiber, acrylic fiber, vinylon, nylon, polyester fiber, polyvinyl chloride fiber, and spandex; and
the biomass is at least one selected from the group consisting of straw, bagasse, tree branches, leaves, wood chips, rice husk, rice straw, peanut shells, coconut shells, palm seed shells, and corn cobs.

\* \* \* \* \*